United States Patent

[11] 3,597,530

| | | |
|---|---|---|
| [72] | Inventor | **Waldemar Hartwich** Toppenstedt, Germany |
| [21] | Appl. No. | 771,148 |
| [22] | Filed | Oct. 28, 1968 |
| [45] | Patented | Aug. 3, 1971 |
| [73] | Assignee | U. S. Philips Corporation New York, N.Y. |
| [32] | Priority | Oct. 26, 1967 |
| [33] | | Germany |
| [31] | | P 15 37 299.3 |

[54] ARRANGEMENT FOR PRODUCING PAL-COLOR TELEVISION TEST SIGNALS

2 Claims, 3 Drawing Figs.

[52] U.S. Cl. .......... 178/5.4 P, 178/5.4 TE

[51] Int. Cl. .......... H04n 9/16, H04n 9/38

[50] Field of Search .......... 178/5.4, 5.4 P, 5.4 TE, 5.4(10)

[56] References Cited

OTHER REFERENCES

Patchett, Colour Television With Particular Reference To The PAL System, 1967. pp. 140— 151. Scientific Library TK 6670. P15 C, 2 Copy in A.U. 233

*Primary Examiner*—Robert L. Richardson
*Attorney*—Frank R. Trifari

ABSTRACT: A test circuit for a PAL-TV receiver features a source of PAL-test signals which are gated every other line. From frame to frame the gated lines are alternated between the odd and even numbered lines. The resultant signals are applied to the receiver where any misadjustment errors result in the "Venetian Blind" effect.

Figure 1:
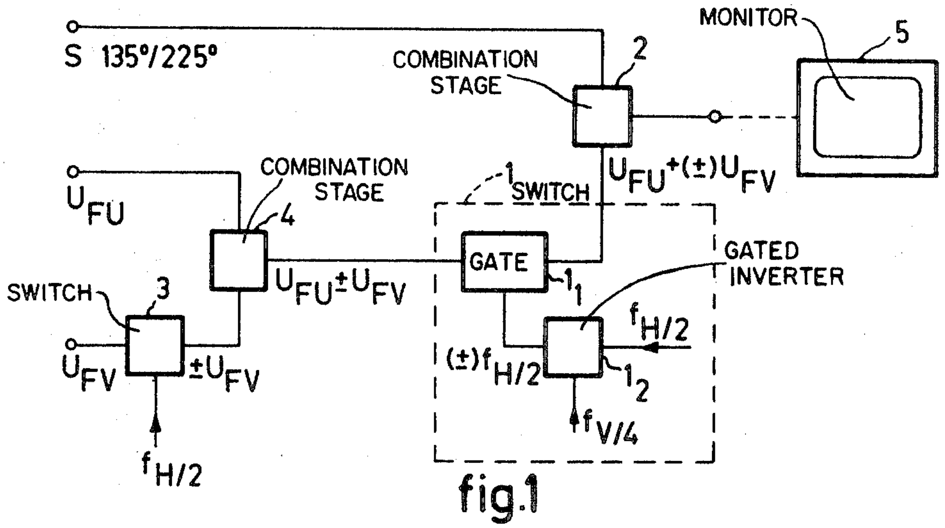

INVENTOR.
WALDEMAR HARTWICH
BY
AGENT

ARRANGEMENT FOR PRODUCING PAL-COLOR TELEVISION TEST SIGNALS

This invention relates to an arrangement for producing PAL-color television test signals in which the automatic compensation of errors during decoding is eliminated. Thus no switching operations are required for checking PAL-decoders from a viewpoint of technical measurement and in picture display apparatus it is possible to carry out any corrections of adjustment optically from the viewing screen.

Since with decoders according to the PAL-standard method any phase errors of the color signal which occur at the transmitting and the receiving end are apparent only as amplitude errors (less saturation) it is necessary for optimum adjustment of the decoders that either switching operations are carried out or special color test signals are available. Switching operations to be carried out involve, in addition to the drawback of unavoidable loss of time, the risk of disturbance in the function of the object to be measured and are therefore to be avoided as far as possible.

To avoid such switching operations it is already known to produce special PAL-color test signals in that several color components selected in accordance with very specific viewpoints still undergo additional polarity switchings with the aid of the known PAL-switch with the horizontal and vertical frequency respectively. This is summarized in report No. 123 of the "Institute fuer Rundfunktechnick", Muenchen. The remaining disadvantage of these combinations of signals resides in the fact that, in order to permit all adjustments, a plurality of test signals must be used so that it is necessary to proceed in accordance with a predetermined adjustment scheme which takes up some time.

By means of line-sequential blanking of the color signal it is possible to produce an NTSC-signal, the adjustment of the decoder being facilitated by comparison with the PAL-signal. However, in this case the drawback remains that the two synchronous demodulators only can be tested and adjusted. It is therefore an object of this invention to provide a test circuit for a PAL-TV receiver where the resultant test pattern allows for adjustment of the amplitude and phase of a PAL-delay line as well as the synchronous demodulators in any order and without the use of an oscilloscope.

The present invention provides a means of permitting the amplitude and phase adjustments of a PAL-delay line simultaneously and independently of each other together with the adjustment of the two synchronous modulators, by means of an arbitrary PAL-color signal $U_{FU}\pm U_{FV}$, the sequence of the adjustments being arbitrary. The arrangement according to the invention required for this purpose is characterized in that it includes an electronic switch which blanks the color information every other line, and that the switching frequency ($f_H/2$) is so inverted with the picture frequency ($f_V/2$) that from picture to picture a change in polarity of the $U_{FV}$-modulation component takes place.

In order that the invention may be readily carried into effect it will now be described in detail, by way of example, with reference to the accompanying diagrammatic drawings, in which:

FIG. 1 shows a block diagram of an arrangement according to the invention and

Figure 2A:
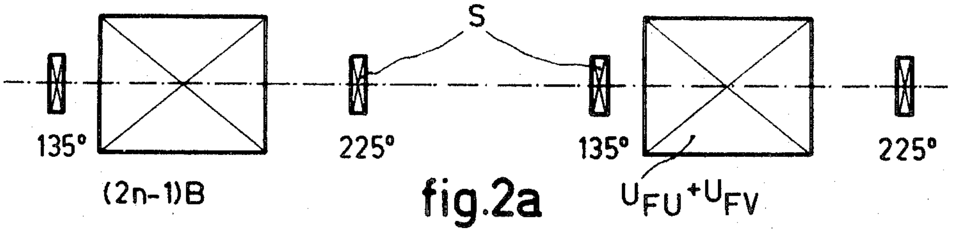
Figure 2B:
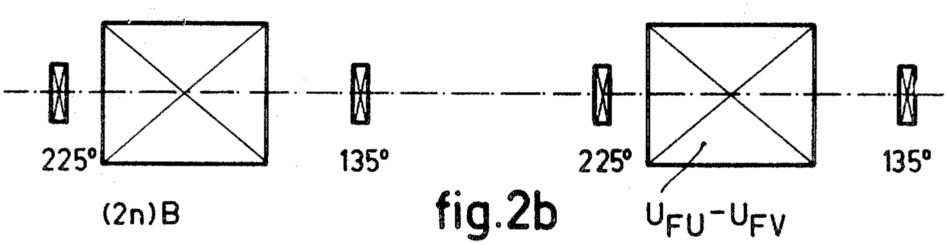

FIGS. 2*a* and 2*b* show the signal variation in time sequence, where

FIG. 2*a* shows the odd pictures and

FIG. 2*b* shows the even pictures.

In FIG. 1 an electronic switch 1 provided in accordance with the invention interrupts at line frequency a color signal $U_{FU}\pm U_{FV}$ applied thereto, before being applied to a combination stage 2. The PAL-color signal $U_{FU}\pm U_{FV}$is obtained, for example, by applying the color signal component $U_{FV}$ via an electronic switch 3, which switches at a frequency $f_H/2$ and provides alternately a signal +and $-U_{FV}$ or $+U_{FV}$ for two sequential lines, to a combination stage 4, which is also fed with color signal component $U_{FU}$. The combination stage 2 has also applied to it a color burst S with alternately a phase difference of 135° and 225° relative to the signal $U_{FV}$. At the output of the combination stage 2 there appears a PAL-test signal which may be applied, for example, to a monitor or receiver 5 to be tested, the color information in the test signal being absent every other line. The switching frequency $f_H/2$ of the electronic switch 1 is so inverted with the picture frequency $f_V/2$ that the output signal of the combination stage 2 in every other line has the form $U_{FU}+(\pm)U_{FV}$. In order to realize this, the electronic switch 1 may be designed with a gate circuit $1_1$ which passes the switched color signal $U_{FU}+U_{FV}$ for a picture and which passes the switch color signal $U_{FU}-U_{FV}$ for a succeeding picture. To this end, the gate circuit $1_1$ may be switched by means of a switching signal of frequency $f_H/2$ which is applied through a gated phase-inverting stage $1_2$ itself being controlled by means of a gating signal $f_V/4$ so that the switching signal of each field is inverted in phase. For illustration there applies that, for example, the frequency $f_v$=50 *c/s* and $f_H$=15,625 *c/s*.

FIG. 2*a* and 2*b* show the consequence of the use of the electronic switch 1. For the odd pictures which are indicated by $(2n-1)B$, the switch 1 passes on the color signal $U_{FU}+U_{FV}$ for determined lines and for the even pictures indicated by $(2n)B$ it passes on the color signal $U_{FU}-U_{FV}$ for the same determined lines.

The advantage of the arrangement according to the invention resides in the fact, that all adjustments in the PAL-decoders can be carried out in one operation by means of test signals which are for example a rainbow signal obtainable in a very simple manner, without a predetermined scheme. In the use for technical measurement, the visualizing apparatus (oscillograph) for all adjusting operations is connected at one point to the output of the decoder and it is necessary only to adjust the reproduced signal waves so as to overlap one another. If the PAL-decoder is followed, for example, by a picture display apparatus designed as a monitor 5, the total adjustment may be carried out optically from the viewing screen, since all phase errors become apparent as 12.5 *c/s* flickerings and amplitude errors cause standing line structures (a so-called Venetian blind). This is of paramount importance especially in outdoor service (for example in the color television service) since the engineer cannot take suitable oscillographs with him.

What I claim is:

1. A test circuit for a television receiver having selected horizontal and vertical scanning frequencies comprising a source of color television chrominance signals, said signals having two quadrature components one of which alternates in phase at the horizontal frequency; a gate having an input coupled to said source, an output, and a control terminal; means for gating said color television signal every other line and changing the order of gating between adjacent frames including a gated inverter circuit having an output coupled to said gate control terminal, an input coupled to receive a switching signal having a frequency of half the horizontal scan frequency, and a control terminal coupled to receive a switching signal of one quarter of the vertical scan frequency; and means for applying the output of said gate to said receiver.

2. A circuit as claimed in claim 1 wherein said applying means comprises a combining circuit and further comprising a source of burst signals coupled to said combining circuit.

PO-1050
(5/69)

UNITED STATES PATENT OFFICE
CERTIFICATE OF CORRECTION

Patent No. 3,597,530 Dated August 3, 1971

Inventor(s) WALDEMAR HARTWICH

It is certified that error appears in the above-identified patent and that said Letters Patent are hereby corrected as shown below:

IN THE TITLE PAGE below "Germany" cancel "P 15 37 299.3" and insert --

P.43258 --;

Signed and sealed this 31st day of December 1974.

(SEAL)
Attest:

McCOY M. GIBSON JR.
Attesting Officer

C. MARSHALL DANN
Commissioner of Patents